No. 678,848. Patented July 16, 1901.
J. KROULIK.
BINOCULAR MICROSCOPE.
(Application filed Aug. 28, 1900.)
(No Model.)
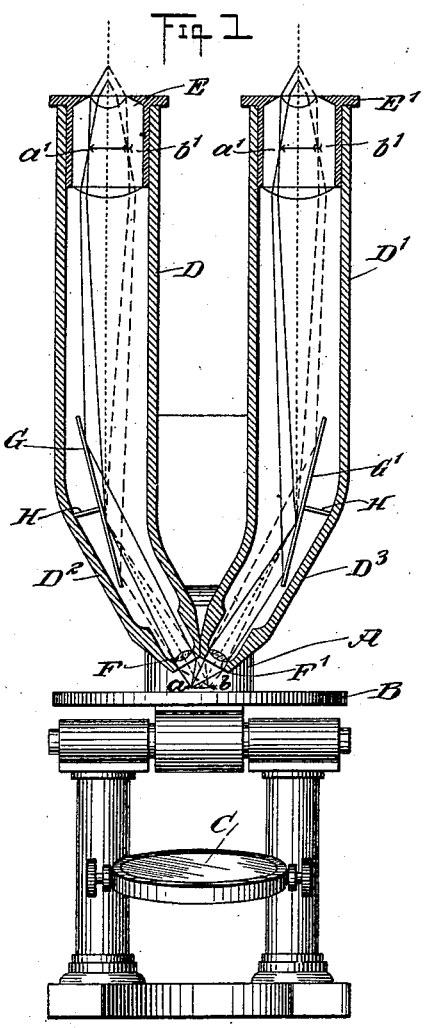
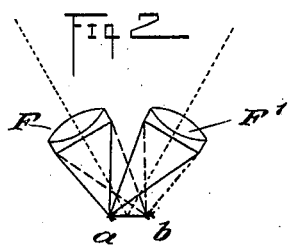
WITNESSES:
INVENTOR
Joseph Kroulik.
BY
ATTORNEYS

UNITED STATES PATENT OFFICE.

JOSEPH KROULIK, OF ROCHESTER, NEW YORK.

BINOCULAR MICROSCOPE.

SPECIFICATION forming part of Letters Patent No. 678,848, dated July 16, 1901.

Application filed August 28, 1900. Serial No. 28,290. (No model.)

*To all whom it may concern:*

Be it known that I, JOSEPH KROULIK, a subject of the Emperor of Austria-Hungary, and a resident of Rochester, in the county of Monroe and State of New York, have invented a new and useful Improvement in Binocular Microscopes, of which the following is a full, clear, and exact description.

My invention relates to binocular microscopes, and has for its object to provide a simple construction by which a powerful dissolving action and plastic vision may be obtained.

The invention will be fully described hereinafter and the features of novelty pointed out in the appended claim.

Reference is to be had to the accompanying drawings, forming a part of this specification, in which similar characters of reference indicate corresponding parts in both figures.

Figure 1 is a central sectional elevation of my improved microscope, and Fig. 2 is a detail view of the two objectives in connection with the object.

The microscope comprises a frame A of any suitable construction, provided with a stage B for supporting the object and a mirror C for throwing light upon the object from below. Upon the frame is carried the body of the microscope, consisting of two tubes which in their main portions D D' are parallel or slightly divergent, while in their lower portions $D^2 D^3$ they converge. The tubes at their upper ends carry eyepieces E E' of any approved construction and at their bottom object-glasses F F', likewise of any suitable type. It will be observed that each tube has its own object-glass. These glasses are so arranged that their axes intersect upon the object indicated by the arrow $a\ b$ and resting upon the stage B. At the bends connecting the upper portions D D' of the tubes with the lower portions $D^2 D^3$ and upon the outer or opposite sides of said tubes are arranged mirrors G G', held by supports H H' and arranged in planes substantially perpendicular to lines bisecting the angles which the upper portions D D' form with the lower portions $D^2 D^3$, so that the planes of the mirrors will form equal angles with the axes of the two portions of the microscope-tubes.

To facilitate an understanding of the optical action, I have indicated in the drawings by full lines the two extreme rays of light proceeding from the extremity $a$ of the object and by dotted lines the corresponding rays of light proceeding from the other extremity $b$ of the object. It will be seen that each object-glass throws an inverted image upon the corresponding mirror G or G', which reflects this image toward the eyepiece, inverting the image a second time, so that it becomes upright, as at $a'\ b'$. Each point of the object sends different rays of light into the two object-glasses, or, in other words, each point of the object is viewed from different directions by the two object-glasses, and consequently by the eyes of the observer. I hereby secure a very effective plastic or stereoscopic vision. I also find that my improved construction enables me to obtain a high magnifying and dissolving power by the use of object-glasses of greater simplicity than those commonly employed.

Having thus fully described my invention, I claim as new and desire to secure by Letters Patent—

A binocular stereoscopic microscope provided with an object-support and two tubes each of which has an object-glass portion and an eyepiece portion at an angle thereto, the optical axes of the two object-glass portions intersecting upon the object-support and the distance between the two eyepieces corresponding to the distance between a man's eyes, a separate object-glass for each tube, and a mirror located in each tube at the junction of the two portions thereof upon the outer side of the tube and arranged to throw (by a single reflection) the rays of light coming from the object-glass, toward the eyepiece.

In testimony whereof I have signed my name to this specification in the presence of two subscribing witnesses.

JOSEPH KROULIK.

Witnesses:
J. F. HOVEY,
C. AORTED DOWNS.